US010979765B2

(12) United States Patent
Rege

(10) Patent No.: US 10,979,765 B2
(45) Date of Patent: Apr. 13, 2021

(54) ISSUE REPORTING BY A RECEIVING DEVICE

(71) Applicant: Dish Network, L.L.C., Englewood, CO (US)

(72) Inventor: Sanket Rege, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 118 days.

(21) Appl. No.: 16/237,630

(22) Filed: Dec. 31, 2018

(65) Prior Publication Data

US 2020/0213665 A1  Jul. 2, 2020

(51) Int. Cl.
*H04N 21/4425*  (2011.01)
*H04N 7/173*  (2011.01)
*H04N 21/24*  (2011.01)

(52) U.S. Cl.
CPC ..... *H04N 21/4425* (2013.01); *H04N 7/17309* (2013.01); *H04N 21/2401* (2013.01); *H04N 21/2404* (2013.01)

(58) Field of Classification Search
CPC .................................................. H04N 21/4425
See application file for complete search history.

(56) References Cited

U.S. PATENT DOCUMENTS

| | | | | |
|---|---|---|---|---|
| 2008/0228787 | A1* | 9/2008 | Merritt | H04L 1/1614 |
| 2012/0246623 | A1* | 9/2012 | Creel | G06F 11/3672 717/128 |
| 2017/0048585 | A1* | 2/2017 | Dong | G06F 3/167 |
| 2018/0365096 | A1* | 12/2018 | Mamillapalli | G06F 11/0709 |

\* cited by examiner

*Primary Examiner* — Xiaolan Xu
(74) *Attorney, Agent, or Firm* — Perkins Cole LLP

(57) ABSTRACT

A technique is described for improved issue reporting by a receiving device such as a set-top boxes for satellite and cable television services. In an example embodiment, the receiving device generates an issue report based on internal operational logs, captured screens and/or video of a visual output, and a recording of the user's voice that includes a description of the issue they are experiencing. This issue report can be generated as an object file that can then be transmitted, via a communications network, to an issue reporting platform for processing, for example, by a technical support representative or an automated troubleshooting system.

20 Claims, 5 Drawing Sheets

ISSUE REPORTING BY A RECEIVING DEVICE

BACKGROUND

Receiving devices, such as set-top boxes for satellite and cable television services, allow a user to view media streams from a variety of media sources. The receiving device generally renders a media stream shortly after receiving a request from the user to view the media stream. For example, the user may send a request to the receiving device to change to a different television channel, then the receiving device tunes to the new television channel and renders the media stream from the new television channel.

DETAILED DESCRIPTION

Figure 1:
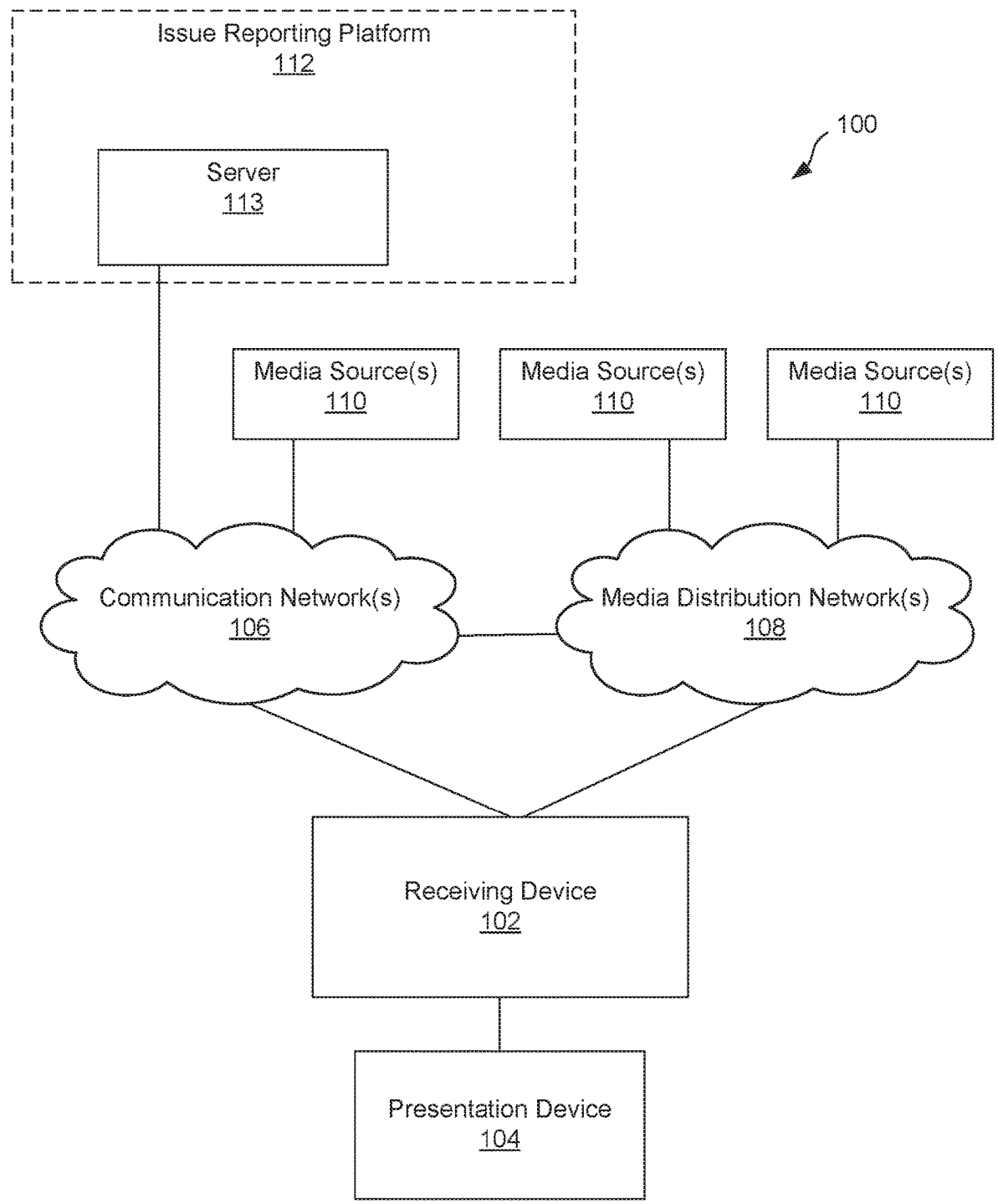
FIG. 1 is a block diagram of an example networked system for presenting a media stream to a user.

Issues may arise when presenting media streams to a user using a receiving device such as a set-top box for satellite and cable television services. The term "issue" is used herein for simplicity; however, the term issue shall be understood to encompass "errors," "failures," "faults," "problems," or any other situations that involve the unsuccessful or perceived unsuccessful delivery of media to a user. Issues may occur at the receiving device and/or at any one or more other network-connected devices that are responsible for delivering media streams from media sources for presentation to a user. Issues may be caused by software errors, hardware faults or failures, network congestion, and/or anything else that may negatively impact a user's perception of an audio-visual (AV) output based on a received media stream. In some cases, issues may be caused by actual operational failures whereas in other cases issues may be perceived by a user, but otherwise not associated with an actual operational failure.

Current issue troubleshooting practices typically involve a user calling or other otherwise contacting (e.g., via an online portal) a remotely located technical support resource to explain the issue and seek a resolution. This process can be tedious and inefficient for both the user as well as any technical support representative tasked with troubleshooting the issue. For example, depending on levels of technical expertise, some users may have difficulty explaining the issue they are experiencing. Further, a user's perception of the issue may not provide a full picture of the problem in the system causing the issue. Similarly, internal machine-generated operational logs may be difficult to decipher and do not effectively convey to a technical support representative what the user is perceiving.

Introduced herein is an innovative technique for issue reporting by a receiving device that addresses these problems. The introduced technique utilizes functionality for capturing portions of a visual output such as screen captures or video clips and capturing user voice recordings to generate improved issue reports that provide a more robust representation of the issue, thereby improving the process for troubleshooting the issue. In an example embodiment, the receiving device generates an issue report based on internal operational logs, captured screens and/or video of a visual output, and a recording of the user's voice that includes a description of the issue they are experiencing. This issue report can be generated as an object file that can then be transmitted to a technical support resource such as a human representative or a computer system that can process the report and provide a solution.

The introduced technique provides for a streamlined issue reporting process that is interactive for the user, informative for the technical support resource, and therefore represents a significant technical innovation in networked media device technology. Further, the introduced technique can also be applied in other contexts such as when testing new devices and software, for example, as part of an alpha or beta testing program.

FIG. 1 shows a block diagram that illustrates an embodiment of a system 100 for presenting a media stream to a user. The system 100 of FIG. 1 is operable to deliver media streams from one or more media sources to be presented to a user. The system 100 includes a receiving device 102, a presentation device 104 (e.g., a display and speakers), a communications network 106, and a media distribution network 108. Media sources 110 deliver media streams via any of the communications network 106 and/or media distribution network 108, which in turn transmit the media streams to the receiving device 102. In some embodiments, media sources 110 may provide media streams directly to the receiving device 102 (either internally or externally of the receiving device 102). Examples of media sources may include a television channel from a broadcast station, a storage medium containing user-recorded content, automatically recorded content, and/or purchased content, an on-demand media streaming service, a pay-per-view media streaming service, and/or an over-the-top media streaming service. The media sources 110 may provide media streams to one or more of the communications network 106, the media distribution network 108, and the receiving device 102.

Exemplary media stream formats include Motion Picture Experts Group (MPEG) standards, Flash, Windows Media and the like. It is to be appreciated that the media stream may be supplied by any source, such as an over-the-air broadcast, a satellite, or cable television distribution system, a digital video disk (DVD) or other optical disc, the Internet or other communication networks, and the like. In at least one embodiment, the media data may be associated with supplemental data that includes text data, such as closed captioning data or subtitles. Particular portions of the closed captioning data may be associated with specified portions of the media data.

Generally, a media stream is a contiguous block of associated audio and video data that may be transmitted to, and received by, an electronic device, such as a terrestrial ("over-the-air") television receiver, a cable television receiver, a satellite television receiver, an Internet connected television or television receiver, a computer, a portable electronic device, or the like.

Further, a media stream may be delivered by any transmission method, such as broadcast, multicast, simulcast, closed circuit, pay-per-view, on-demand, over-the-top (by "streaming," file transfer, or other means), or other methods.

Additionally, the media stream may be transmitted by way of any communication technology, such as by satellite, wire or optical cable, wireless, or other means. The media stream may also be transferred over any type of communication network, such as the Internet or other wide area network, a local area network, a private network, a mobile communication system, a terrestrial television network, a cable television network, and a satellite television network.

The receiving device 102 may access the media sources 110 in various ways. For example, the receiving device 102 may access a television channel by demodulating and decrypting a media stream from the television distribution network 106. The receiving device 102 may access an over-the-top media streaming service by logging into a remote server and downloading the media stream over the communications network 106. In some embodiments, the receiving device 102 may check a user's subscription to the over-the-top media streaming service and/or offer a subscription to the over-the-top media streaming service. The receiving device 102 may access a storage medium connected to the receiving device 102 using a local communication bus, such as parallel ATA (PATA, also called IDE or EIDE), Serial ATA (SATA), SCSI, Serial Attached SCSI (SAS), Fibre Channel, IEEE 1394 (also called FireWire), USB, SCSI, or Thunderbolt.

The communications network 106 may be any communication network capable of transmitting data of any type including a media stream. Exemplary communications networks include wireless communication networks, public switched telephone networks (PSTN), local area networks (LAN), and wide area networks (WAN) providing data communication services and/or Internet access.

The content distribution network may be any type of distribution network capable of delivering media streams to the receiving device 102. For example, the media distribution network 108 may include a television distribution network configured to deliver a television broadcast to the receiving device 102. The television distribution network may include over-the-air, satellite, and cable television networks. The media distribution network may also include other content distribution networks (CDN) specifically configured for delivering media streams to the receiving device. A CDN may include geographically distributed proxy servers that communicate over one or more communications networks 106 to optimally deliver live and/or on-demand media streams to the receiving device 102.

The communications network 106 and media distribution network 108 may utilize any desired combination of wired (e.g., cable and fiber) and/or wireless (e.g., cellular, satellite, microwave, and radio frequency) communication mediums and any desired network topology (or topologies when multiple mediums are utilized).

The receiving device 102 of FIG. 1 may be any device capable of receiving a media stream from the communications network 106, the media distribution network 108, and/or directly from a media source 110 (either internal or external of the receiving device 102). For example, in the case of the media distribution network 108 being a cable or satellite television distribution network, the receiving device 102 may be a set-top box configured to communicate with the television distribution network. The receiving device 102 may be a digital video recorder (DVR) in some embodiments. In another example, the receiving device 102 may be computer, a personal digital assistant (PDA), or similar device configured to communicate with the Internet or comparable communications network 106. The receiving device 102 may also receive, capture, and record media streams from non-broadcast media sources, such as video recorders, DVD players, personal computers or the Internet.

The presentation device 104 may be any device configured to receive an AV stream from the receiving device 102 and present the AV stream to a user. Examples of the presentation device 104 include a television, a video monitor, or similar device capable of presenting audio and video information to a user. The receiving device 102 may be communicatively coupled to the presentation device 104 through any type of wired or wireless connection. Exemplary wired connections include coax, fiber, composite video and high-definition multimedia interface (HDMI). Exemplary wireless connections include Wi-Fi, ultra-wide band (UWB) and Bluetooth. In some implementations, the presentation device 104 may be integrated within the receiving device 102. For example, each of a television, a computer, or other mobile computing device (e.g., a smart phone or tablet device) may serve as both the receiving device 102 and the presentation device 104 by providing the capability of receiving media streams from the communications network 106, the media distribution network 108, and/or directly from a media source 110, and presenting the received media streams to a user, for example, via an integrated display screen and speakers. In another implementation, a cable-ready television may include a converter device for receiving media streams from the media distribution network 108 (e.g., a cable television distribution network) and displaying the media streams to a user via a display screen. Similarly, a network-connected "smart" television may include a network interface for receiving media streams via the communications network 106 and displaying the media streams to a user via a display screen.

In the system 100, a user requests the receiving device 102 to render a media stream provided by one or more media sources 110, for example, by converting the received media stream into an AV stream that is presentable at the presentation device 104. The media stream includes audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations or by other media sources 110.

In some cases, issues may occur at any one or more of the components in system 100 which impact the presentation of AV streams to a user. For example, issues may occur at any one or more media sources 110, along networks 106 and/or 108, at the receiving device 102, and/or at the presentation device 104 that negatively impact or otherwise prevent the successful presentation of requested media streams to a user. According to embodiments of the introduced technique, issue reports may be generated by the receiving device 102 and transmitted, over a communications network, to one or more server computers 113 associated with a network connected issue reporting platform 112. The issue reporting platform 112 may be associated, for example, with a customer service platform that services users of the receiving device 102, users of any one or more media sources 110, or any other type of customer service platform. In some embodiments, the issue reporting platform 112 is associated with a media service provider such as a cable television provider, satellite television provider, or a network media provider. In some embodiments, the issue reporting platform 112 is implemented as part of a software testing platform to facilitate the reporting of issues from receiving devices used by testers participating in testing programs (e.g., alpha and beta testers).

Figure 2:
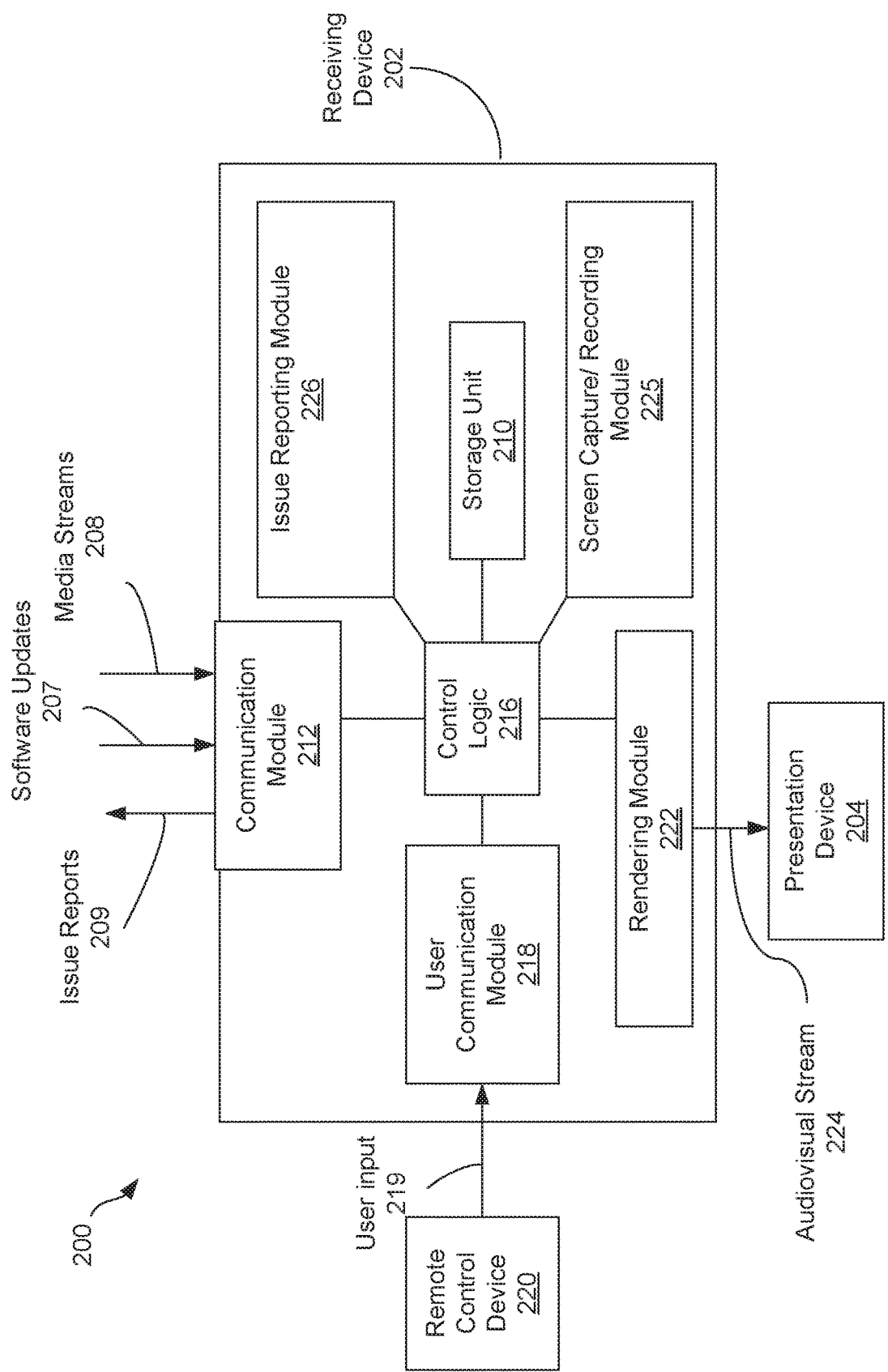
FIG. 2 is a block diagram of an example receiving device for presenting a media stream to a user.

FIG. 2 shows a block diagram of an example receiving device 202 in a system 200 for presenting a media stream to a user. The receiving device 202 may be an example of the receiving device 102 described in reference to FIG. 1. The receiving device 202 will be described with reference to the communications network 106, media distribution network 108, and media sources 110 described in the system 100 of FIG. 1.

The receiving device 202 includes a communication module 212. The communication module 212 may include one or more transmitters for transmitting information over networks 106 and/or 108 and/or one or more receivers for receiving information from networks 106 and/or 108. In some embodiments, the communications module 212 may include sub-modules such as a television receiver for receiving television media streams 208 from a television distribution network. For example, the communication module 212 may be capable of receiving a high definition television media stream, a standard definition television media stream, a 3-D television media stream, or other types of television media streams. The communications module 212 may also include a network adapter for receiving network media streams 208 or other data from a communication network 106. For example, the communication module 212 may be capable of receiving a media stream 208 and/or software updates 207 from the Internet (e.g., an over-the-top media stream), a media stream from network storage device attached to a LAN or WLAN (e.g., network attached storage), or other types of media streams transmitted over a data communication network. In some embodiments, the communication module may be capable of transmitting data, such as issue reports 209, to an issue reporting platform 112 via a communication network 106. The communication module 212 is depicted in FIG. 2 as a single module for illustrative purposes and is not to be construed as limiting. A person having ordinary skill will recognize that the receiving device 202 may include multiple different modules for receiving and/or transmitting information over one or more communications networks 106 and or media distribution networks.

The receiving device 202 also includes one or more data storage units 210 that may be internal and/or external to the receiving device 210. The storage unit 210 may store any type of data such as media streams, recordings, operational logs, user profile information, processing instructions, etc. When storing media, the storage unit 220 may act as a media source 110 for the receiving device 202.

The receiving device 202 may also include user communication module 218 for receiving user input 219 from a remote control device 220 and/or transmitting information to the remote control device 220. User input may include, for example, control commands based on user interaction with the remote control device 220 as well as other information such as audio input, voice commands, or other data. The remote control device 220 may comprise a device dedicated to control of the receiving device 202 such as a television or set-top box remote or may comprise a multi-purpose mobile device such as a smart phone device or tablet computing device. Where implemented as a multi-purpose device, the remote control device 220 may include an application or other software to facilitate communication with the receiving device 202. Depending on the type of device, the remote control device 220 may communicate with the user communication module 218 over any type of wireless or wired connection. In some embodiments, the remote control device 220 may communicate directly with the user communication module 218 using infrared signals and/or short range RF signals such as Bluetooth. In some embodiments, the remote control device 220 may communicate with the user communication module 218 over a wireless LAN (e.g., Wi-Fi). In such cases, the user communication module 218 may be part of or otherwise associated with the communication module 212 for communicating over a communications network 106.

The receiving device 202 may also include a rendering module 222 for rendering a media stream and outputting an AV stream 224 to a presentation device 204 (i.e., similar to presentation device 104) for presentation to a user. Note that the term "AV stream" is used for simplicity; however, the stream 224 may include just audio data or just video data. Further, the AV stream 224 may be in any format that is appropriate for the presentation device 204. For example, the AV stream 224 may include digital signals or analog signals. The rendering module 222 may also render various graphical user interface (GUI) features that can be overlaid or otherwise composited with the audiovisual information included in a given media stream 208 to produce a composite audiovisual stream that includes both the media stream and GUI features. Such GUI features may include, for example, an interactive media guide, selectable settings for the receiving device 202, and/or selectable features associated with the introduced technique for issue reporting which will be described in more detail later.

The receiving device 202 may also include a screen capture/recording module 224 (referred to herein as a "recording module" for simplicity) for capturing and storing renderings produced by the rendering module 222 and storing those renderings in the storage unit 210 for later use. Captures by the recording module 225 may include still captures of a screen displayed at the presentation device 204 (i.e., display screen shots) or recorded portions of video included in an AV stream 224. In some embodiments, the recording module 225 is configured to respond to a user input (e.g., from a remote control device 220) to initiate screen capture or recording. Alternatively, or in addition, the recording module 225 may continually capture screens (e.g., periodically every 10 seconds) or continually record video and store such data in the storage unit 210 for later access, as needed. In some embodiments, the recording module 225 may store screens and/or recorded video in the storage unit 210 until the storage unit 210 is full. Alternatively, or in addition, the recording module 225 may be configured to continually delete older screen captures and/or recordings as new screen captures and/or recordings are stored thereby maintaining a substantially steady level of usage of the storage unit 210.

The receiving device 202 may also include an issue reporting module 226 for generating issue reports 209 to be transmitted to an external issue reporting platform 112. For example, in some embodiments, the issue reporting module 226 may generate an operational log in response to detecting or receiving some type of indication of an issue associated with the presentation of media streams 208 to a user. Issues may be caused by software and/or hardware errors internal to the receiving device 202, issues with the external presentation device 204, issues with one or more media sources 110, connection issues with networks 106 and/or 108, and or anything else that may impact the user's perception of the presented AV stream 224 at the presentation device 204. As will be described, the issue reporting module 226 may also be configured to package internally generated operational logs with other information such as relevant screen captures or video recordings (e.g., generated by the recording module 225) and/or user voice recordings captured by an audio capture device (e.g., a microphone), and transmit the packaged issue reports 209 to the external issue reporting platform 112 for processing, for example, to troubleshoot the issue. The audio capture device (which is not depicted in FIG. 2) may be integrated with the remote control device 220, the receiving device 202, or the presentation device 204. Alternatively, or in addition, the audio capture device may be a standalone device that is connected to any of the aforementioned devices.

The receiving device 202 may also include control logic 216 that is operable to control and coordinate the activities of the various other components of the receiving device 202. For example, the control logic 216 may be operable to control the reception of media streams from the communication module 212 and the storage unit 210. The control logic 216 may also coordinate the storage of a media stream to the storage unit 210. The control logic 216 may then coordinate the output of a media stream to the rendering module 222 and cause the rendering module 222 to render the media stream, generate the AV stream 224 based on the rendering, and output the AV stream 224 to the presentation device 204. Furthermore, the receiving device 202 and system 200 may include other components, modules, elements, or devices not illustrated for the sake of brevity.

Figure 3:
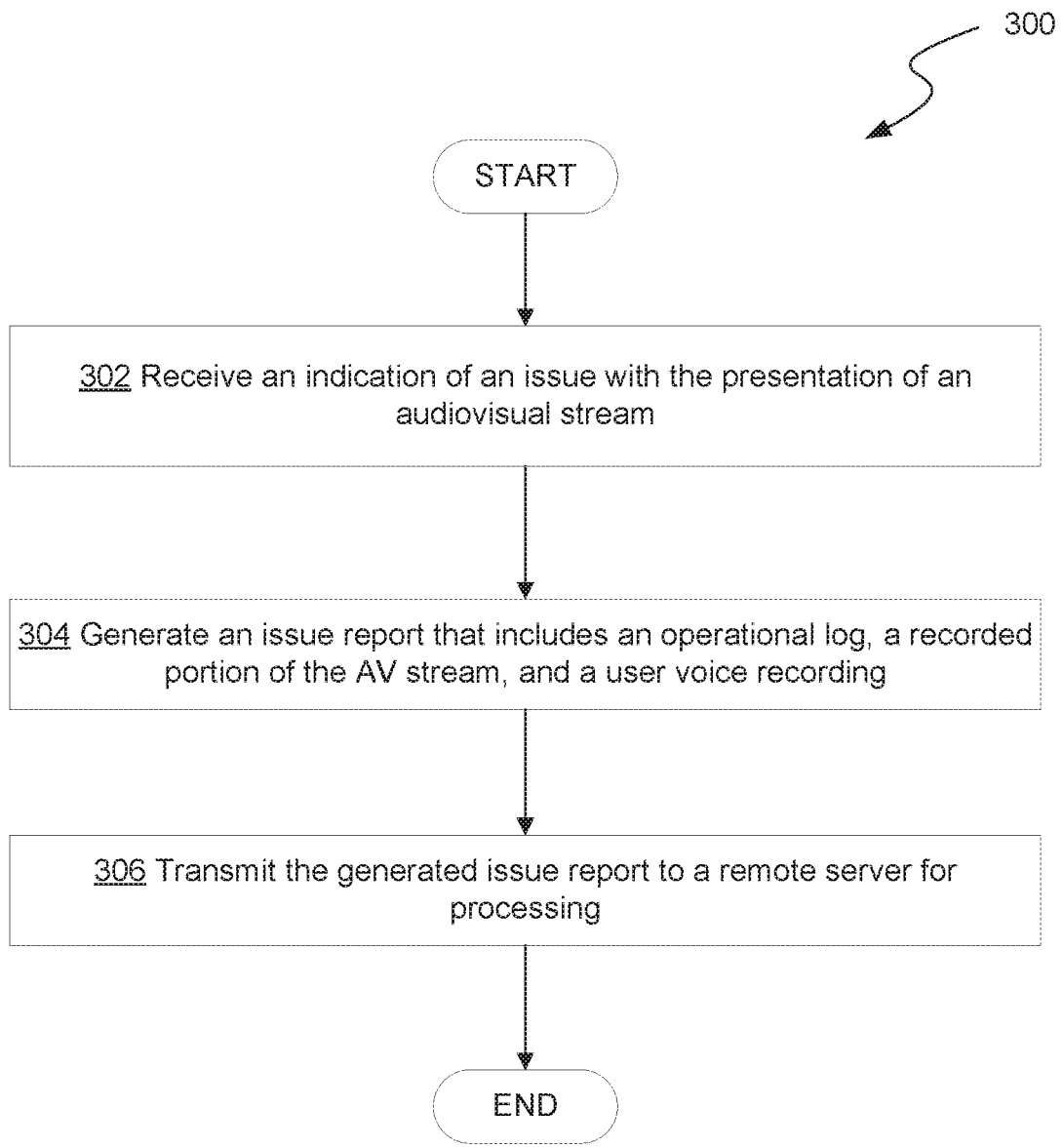
FIG. 3 is a flow chart of an example process for issue reporting by a receiving device.
Figure 4:
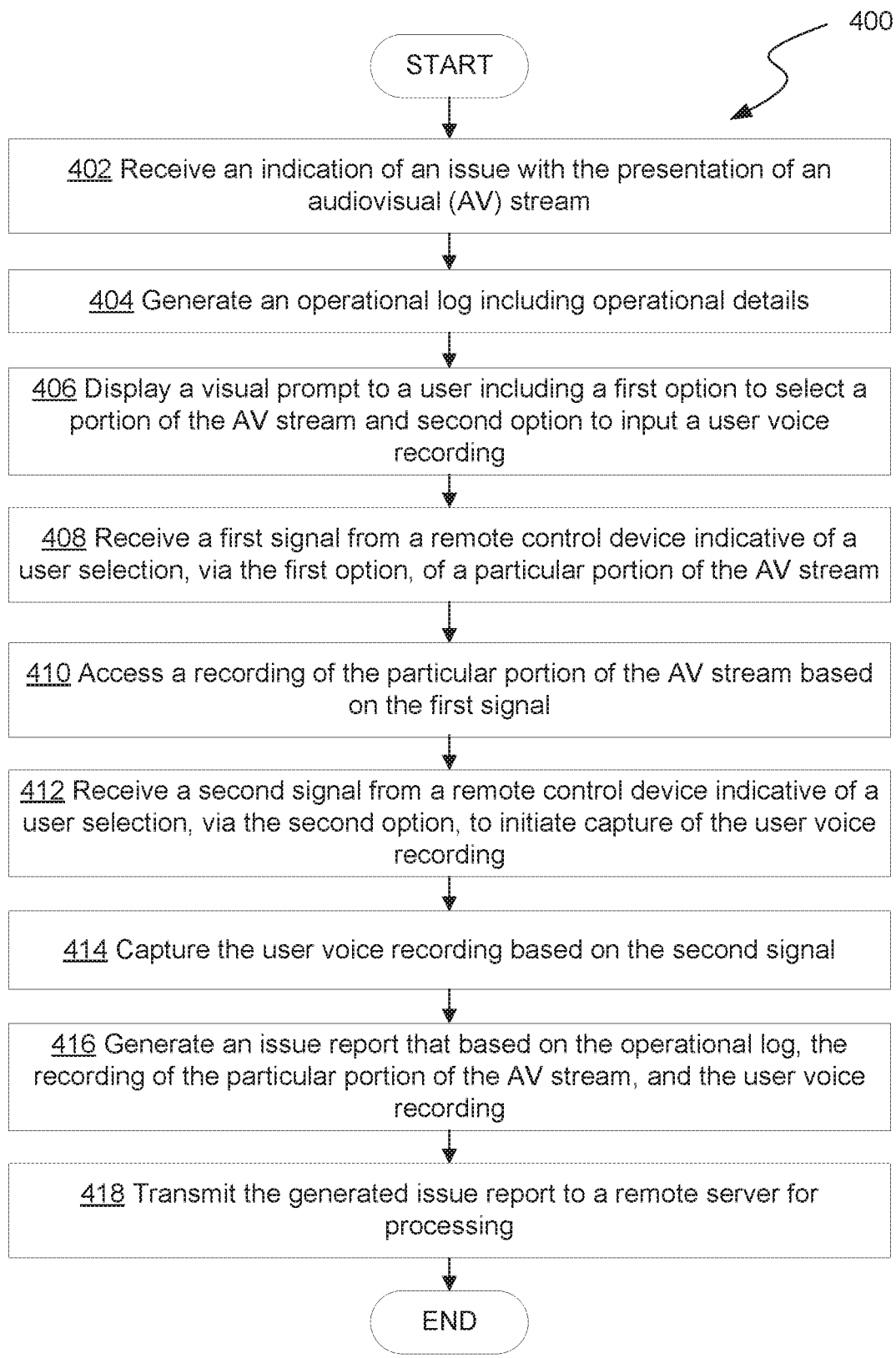
FIG. 4 is a flow chart of another example process for issue reporting by a receiving device.

FIGS. 3-4 show flow diagrams of two example processes according to the introduced technique. One or more steps of the example processes depicted in FIGS. 3-4 may be performed by any one or more of the components of the example computer system 500 described with respect to FIG. 5. For example, the example processes 300 and 400 depicted in FIGS. 3-4 may be represented in instructions stored in memory that are then executed by a processing unit. In some embodiments, the one or more of the steps of example processes 300 and 400 may be performed by a receiving device similar to the receiving device 202 described with respect to FIG. 2. In some embodiments, one or more steps of the example processes 300 and 400 may be performed by any one or more of the components of a receiving device 202, such as an issue reporting module 226 and/or control logic 216. The example processes 300 and 400 described with respect to FIGS. 3-4 are examples provided for illustrative purposes and are not to be construed as limiting. Other processes may include more or fewer steps than depicted while remaining within the scope of the present disclosure. Further, the steps depicted in example processes 300 and 400 may be performed in a different order than is shown.

FIG. 3 is a flow chart of an example process 300 for issue reporting according to an embodiment of the introduced technique.

The example process 300 begins at step 302 with receiving an indication of an issue with the presentation of an AV stream 224 to a user. As previously discussed, the issue indicated may be caused by software and/or hardware errors internal to the receiving device 202, issues with the external presentation device 204, issues with one or more media sources 110, connection issues with networks 106 and/or 108, and/or anything else that may impact the user's perception of the presented AV stream 224 at the presentation device 204. In some cases, issues may be caused by actual operational errors with any of the aforementioned systems.

In some cases, issues may be perceived by a user, but otherwise not associated with an actual operational error. For example, a user viewing the presented AV stream 224 may perceive it as lower quality than they expected and provide an input indicative of an issue even if the receiving device 202 and presentation device 204 are otherwise operating normally.

In some embodiments, receiving the indication of the issue may include receiving a signal from a remote control device 220 that is indicative of a user-detected issue. For example, as previously mentioned, a user may perceive an issue with the presentation of the AV stream 224. The user may then interact with the remote control device 220, for example, by pressing a button, to indicate that they perceive an issue. In response to the user's interaction, the remote control device 220 may transmit a signal (e.g., over a wireless connection such as Bluetooth) that can be received by a user communication module 218 of the receiving device 202. The signal may include a message, code, or any other type of information configured to indicate to the receiving device 202 that an issue has been detected or otherwise perceived by the user.

In some embodiments, receiving the indication of the issue may include receiving a user voice command or other type of audio recording that is recognizable by the receiving unit 202 as indicative of an issue. For example, the receiving unit 202 may receive a user voice recording that was captured at an audio capture device (e.g., microphone), process the received voice recording using natural language processing techniques, and recognize the user voice recording as indicative of an issue based on the processing. As an illustrative example, a user may input a voice command using the remote control device 220 that includes some type of keyword or key phrase such as "report issue." The receiving device can process the voice recording resulting from the input voice command and recognize the keyword or key phrase, for example, by parsing identified words spoken in the voice recording and comparing the identified words against a database of predefined user commands (e.g., "report issue").

In some embodiments, receiving the indication of the issue may include receiving a notification, message, or any other type of signal from an internal component of the receiving device 202. Certain components of the receiving device 202 may be configured to continually or periodically monitor their operational state. In response to detecting an error, or other issue, the internal components may transmit a signal, for example, to the issue reporting module 226 that is indicative of the detected issue. For example, the communication module 212 may detect automatically that packets are being dropped at an increased rate indicating possible congestion on any of networks 106 or 108. In response to detecting this issue, the communication module 212 may transmit a signal to the issue reporting module 226 that is indicative of the detected issue. In some embodiments, the internal component may include an operational log (i.e., machine-generated data) describing the state of operation of the internal component when the issue was detected.

Example process 300 continues at step 304 with generating an issue report 209 in response to receiving the indication of the issue. The issue report 209 generated at step 304 may include various types of data such as an operational log describing the operational state of one or more of the components of the receiving device 202 when the issue occurred, a recorded portion of the AV stream 224, and/or a user voice recording that includes a user's description of the actual or perceived issue.

The operational log may comprise machine data generated by any one or more of the internal components of receiving device 202, the remote control 220, and/or the presentation device 204 that describe the operational state of such components. As previously mentioned, in some cases, operational logs may be generated automatically by an internal component in response to that internal component detecting an issue. Alternatively, or in addition, the receiving device 202 may cause operational logs to be generated (e.g., by one or more of the internal components) in response to receiving the indication of the issue. For example, if the issue reporting module 226 receives a signal indicative of low quality picture at the presentation device 204, the issue reporting module 226 may transmit signals to one or more of the components responsible for the picture quality (e.g., rendering module 222, communication module 212, and/or presentation device 204) requesting operational logs of those components. The various components may then transmit their respective operational logs to the issue reporting module 226 for use in generating the issue report 209. In other embodiments, one or more components of the receiving device 202 may continually generate operational logs which the issue reporting module 226 can access and pull as needed in response to receiving an indication of an issue.

The recorded portion of the AV stream 224 may include, for example, one or more screenshots of the display at the presentation device 205 or a video recording or other saved portion of the AV stream 224. In some embodiments, the recorded portion of the AV stream 224 may also include a saved portion of the media stream 208 used to generate the AV stream 224 and any associated metadata. The recorded portion of the AV stream 224 may be in any appropriate format such as JPEG for images or MPEG for video.

In some embodiments, the receiving device 202 may be configured to continually record or otherwise save portions of the AV stream 224 (e.g., still images and/or video) in the storage unit 210, and selectively retrieve portions of the AV stream 224, as needed, when generating the issue report 209. For example, the receiving device 202 may be configured with a continual digital video recorder (DVR) functionality in which a portion of video of some specified length (e.g., 10 minutes) is continually recorded over so that the last 10 minutes of an AV stream 224 are accessible at any given moment.

In such embodiments, in response to receiving the indication of the issue, the issue reporting module 226 may retrieve the recorded portion of the AV stream (e.g., a digital video recording of the last 10 minutes) from the storage unit 210 and either include the entire retrieved portion or some smaller sub-portion (e.g., a 2 minute clip of the retrieved 10 minute video) in the generated issue report 209.

Alternatively, or in addition, the issue reporting module 226 may retrieve a particular recorded portion of the AV stream 224 based on a time stamp associated with the received indication of the issue. For example, if the received indication of the issue includes a timestamp, the issue reporting module may access a recorded portion of the AV stream 224 (i.e., video or a series of screen captures) that extends some specified period of time (e.g., 5 minutes) before and after a point in time indicated by the timestamp.

Alternatively, or in addition, the receiving device 202 may be configured to enable a user to select the portion of the AV stream 224 to include in an issue report 209. For example, a user may cause screen captures to be saved, for example, by interacting with the remote control device 220 in real time as the AV stream 224 is presented at the presentation device 204. In such embodiments, the remote control device 220 may include a "screen capture" button that, when pressed, causes the recording module 225 to capture screen shots from the rendering module 222 and save those screen shots in the storage unit 210 for access by the issue reporting module 226.

Similarly, a user may interact with the remote control to capture video from the AV stream 224. For example, the user may capture video by holding down a "screen capture" button or by pressing a separate "DVR" or "record" button. In some embodiments, the user may utilize a GUI generated by the rendering module 222 to search a listing of recorded portions of the AV stream 224 (e.g., a DVR menu) and select a particular recording to include in the issue report 209.

In some embodiments, various image/video editing features may be provided to the user via the GUI to enable the user to edit the recorded portion of the AV stream 224 before it is included in an issue report 209. For example, using various video edition features, the user may cut a particular clip from a video recording (e.g., cut a relevant 2 minute clip from a 10 minute video), crop a screen capture of recorded video, overlay annotations or other graphics that explain the issue, combine two separate recordings into a single recording, etc.

The user voice recording may be captured using an audio capture device (e.g., a microphone) that is integrated in any of the remote control device 220, the receiving device 202, or the presentation device 204. The user voice recording may comprise an audio recording in any appropriate compressed or uncompressed audio format such as WAV, FLAC, MP3, etc.

In some embodiments, the user voice recording is automatically captured in response to the receiving device receiving the indication of the issue. For example, in response to receiving the indication of the issue, the issue reporting module 226 may cause an audio capture device to begin capturing audio from the surrounding physical environment including the voice of the user. This audio capture may be initiated while a visual prompt is displayed on the presentation device 204 informing the user to begin describing the nature of the issue.

In some embodiments, in response to receiving the indication of the issue, the issue reporting module 226 may cause a visual prompt to be displayed at the presentation device 204 that includes an option for the user to initiate capture of the user voice recording. In response to the displayed prompt, the user may initiate the voice recording, for example, by interacting with the remote control device 220. For example, the remote control device 220 may include a "record audio" or "voice command" button that, when pressed, causes an audio capture device to initiate audio capture. In some embodiments, the audio capture functionality may be integrated with a voice command functionality previously described. In other words, the features enabling a user to input voice commands to control the receiving device 202 may also be implemented to capture a recording of the user's voice that includes an explanation of the issue they are experiencing.

In any case, the captured user voice recording can be saved in the storage unit 210, where the recording can be accessed by the issue reporting module 226 to generate the issue report 209.

In some embodiments, the process of generating the issue report 209 at step 304 may include packaging the various pieces of data (e.g., operational log, recorded portion of the AV stream 224, and user voice recording) into a single file (e.g., an archive file) that can be transmitted, over network 106, to one or more servers 113 associated with an issue reporting platform 112. Alternatively, or in addition, the generated issue report 209 may comprise an object file that links to the various pieces of data (e.g., operational log, recorded portion of the AV stream, and user voice recording). For example, to reduce initial transmission costs, an issue report 209 may be generated that includes links to data stored in the storage unit 210 (e.g., operational log, recorded portion of the AV stream 224, and user voice recording). That object file may then be transmitted to the remote servers 113 of the issue reporting platform 112 to enable selective access (e.g., streaming) of the appropriate media (e.g., an image, video, audio recording, etc.), as needed to troubleshoot the issue.

In some embodiments, the receiving device 202 may be configured to process one or more of the operational log, recorded portion of the AV stream 224, or user voice recording prior to generating and/or transmitting the issue report 209. This processing may include synchronizing one or more of the operational log, recorded portion of the AV stream 224, or user voice recording based on time stamps associated with the respective components. For example, if the operational log is associated with a first timestamp, the recorded portion of the AV stream is associated with a second timestamp, and the user voice recording is associated with a third timestamp, the issue reporting module may synchronize the data based on the respective timestamps. Synchronizing the operational log, recorded portion of the AV stream, and/or user voice recording may enable a person or computer analyzing the issue report 209 to more effectively identify a cause of the issue. For example, by synchronizing the recorded portion of the AV stream 224 and the user voice recording (i.e., to be temporally consistent), the user's explanation included in the voice recording will correspond with what is occurring in the recorded portion of the AV stream 224. In other words, the user voice recording may effectively provide a voice-over narration of the issue occurring in the recorded portion of the AV stream 224.

In some embodiments, the receiving device 202 may be configured to process one or more of the operational log, recorded portion of the AV stream, or user voice recording to determine a characteristic of the actual or perceived issue. For example, before, or as part of, generating the issue report 209, the issue reporting module 226 may analyze the operational log, apply computer vision processing to understand what is occurring in the recorded portion of the AV stream, and/or apply natural language processing to understand what the user is saying in their description of the issue. Based on the processing, the issue reporting module 226 may associate the detected issue with one or more predefined issue categories such as picture quality, audio quality, no signal, GUI bug, hardware malfunction, etc.

The determined characteristic of the issue can then be utilized to steer the issue report 209 to a particular recipient (human or machine) at the issue reporting platform 112 to facilitate more effective troubleshooting. For example, issue reports pertaining to audio quality may be forwarded to a first recipient (e.g., an electronic inbox of an audio quality department) at the issue reporting platform 112 while other issue reports pertaining to video quality may be forwarded to a second recipient (e.g., an electronic inbox of a video quality department). To facilitate the appropriate forwarding, the issue reporting module 226 may generate and apply a tag indicative of the determined issue characteristic to issue reports before transmitting. The "tag" in this context may base some type of identifier associated with the determined characteristic (e.g., picture quality, audio quality, no signal, GUI bug, hardware malfunction, etc.) or may be an identifier associated with an appropriate recipient (e.g., a name, a department, an email address, an IP address, etc.).

Finally, at step 306, the issue report 209 is transmitted, for example via network 106, to a server computer 113 associated with the issue reporting platform 112 for processing.

Processing of the issue report 209 may include a human technical support representative reviewing the issue report 209 to troubleshoot the issue. Processing may also include a computer system processing the issue report 209 to identify a problem causing the issue and generate a recommendation to fix the issue. In some cases, the problem causing the issue may be fixed by a human technical support representative contacting the user (e.g., via phone, email, or a messaging service associated with the receiving device 202) to discuss the problem and to suggest options to fix the problem. In some cases, the issue reporting platform 112 or some other associated system may transmit a software update 207 that is configured to fix the problem. Any number of other appropriate steps to fix the problem may similarly be taken in response to receiving the issue report 209 at the issue reporting platform 112.

FIG. 4 is a flow chart of an example process 400 for issue reporting according to another embodiment of the introduced technique. The example process 400 depicted in FIG. 4 is a more specific embodiment of the example process 300 depicted in FIG. 3, but otherwise includes several similar steps.

Example process 400 begins at step 402 with receiving an indication of an issue with presentation of an AV stream 224 similar to step 302 in example process 300.

Example process 400 continues at step 404 with generating, or causing another module to generate, an operational log that includes operational details of the receiving device 202, or some subcomponent, at a time when the issue occurred.

Example process 400 continues at step 406 with displaying a visual prompt to the user that includes a first option to select a portion of the AV stream associated with the issue and a second option to input a user voice recording of a description of the detected issue. In some embodiments step 406 may include causing the rendering module 222 to generate the visual prompt in a GUI that is displayed at the presentation device 204 along with the visual stream 224.

Example process 400 continues at step 408 with receiving a first signal from a remote control device 220 that is indicative of a user selection, via the first option, of a particular portion of the AV stream such as a screen capture of a video clip.

Example process 400 continues at step 410 with accessing a recording of the user-selected particular portion of the AV stream based on the first signal. As previously discussed, such a recording may be accessed from the storage unit 210 of the receiving device 202.

Example process 400 continues at step 412 with receiving a second signal from the remote control device 220 that is indicative of a user selection, via the second option, to initiate capture of the user voice recording. For example, the user may press a button at the remote control device 220 device to initiate capture of the user voice recording.

Example process 400 continues at step 414 with an audio capture device capturing the user voice recording in response to the second signal.

Example process 400 continues at step 416 with generating the issue report 209 based on the operational log, the recording of the particular portion of the AV stream, and the user voice recording, for example, similar to step 304 in process 300.

Example process 400 concludes at step 418 with transmitting the issue report 209, via network 106, to a server computer 113 associated with the issue reporting platform 112 for processing, for example, similar to step 306 in process 300.

Figure 5:
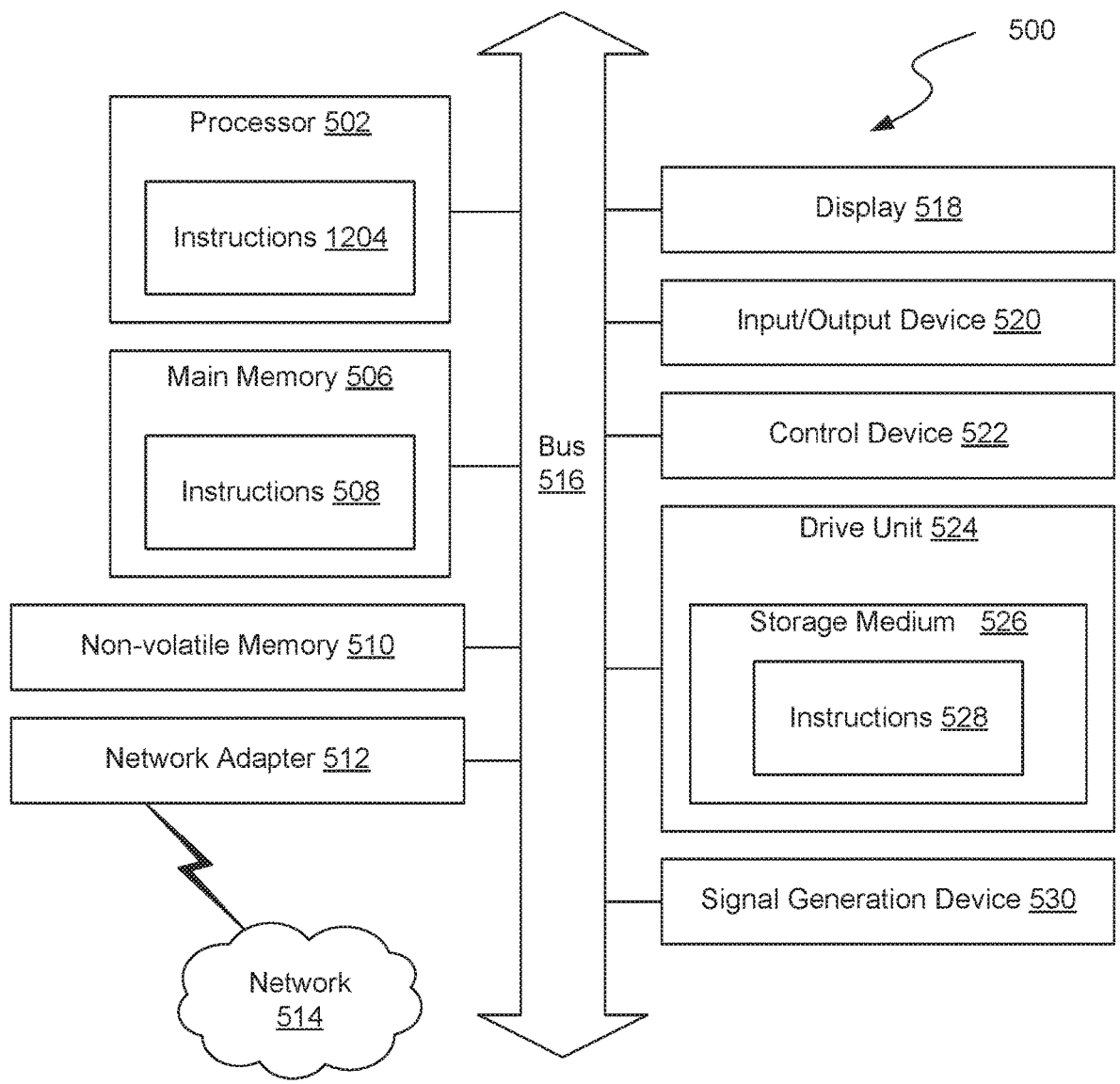
FIG. 5 is a block diagram of an example of a computer system in which at least some operations associated with the introduced technique for issue reporting can be implemented.

FIG. 5 is a block diagram illustrating an example of a computer system 500 in which at least some operations described herein can be implemented. For example, some components of the computer system 500 may be hosted on any one or more of the devices described with respect to system 100 in FIG. 1 such as receiving device 102, presentation device 104, or server 113.

The computer system 500 may include one or more central processing units ("processors") 502, main memory 506, non-volatile memory 510, network adapter 512 (e.g., network interface), video display 518, input/output devices 520, control device 522 (e.g., keyboard and pointing devices), drive unit 524 including a storage medium 526, and signal generation device 530 that are communicatively connected to a bus 516. The bus 516 is illustrated as an abstraction that represents one or more physical buses and/or point-to-point connections that are connected by appropriate bridges, adapters, or controllers. The bus 516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 500 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality system (e.g., a head-mounted display), or another electronic device capable of executing a set of instructions (sequential or otherwise) that specify action(s) to be taken by the computer system 500.

While the main memory 506, non-volatile memory 510, and storage medium 526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 528. The term "machine-readable medium" and "storage medium" shall also be taken to include any medium that is capable of storing, encoding, or carrying a set of instructions for execution by the computer system 500.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in a computing device. When read and executed by the one or more processors 502, the instruction(s) cause the computer system 500 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 510, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 512 enables the computer system 500 to mediate data in a network 514 with an entity that is external to the computer system 500 through any communication protocol supported by the computer system 500 and the external entity. The network adapter 512 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 512 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for facilitating efficient reporting of issues in the presentation of an audiovisual (AV) stream by a receiving device, the method comprising:
   receiving, by the receiving device, an indication of a detected issue with the presentation of the AV stream;
   generating, by the receiving device, a log including operational details of the receiving device at a time when the issue occurred;
   causing, by the receiving device, a visual prompt to be displayed to a user, the visual prompt including:
      a first option to select a portion of the AV stream associated with the detected issue; and
      a second option to input a user voice recording of a description of the detected issue;
   receiving, by the receiving device, a first signal from a remote control device indicative of a user selection, via the first option, of a recorded video clip of the AV stream;
   accessing, by the receiving device, the recorded video clip of the AV stream based on the first signal;
   receiving, by the receiving device, a second signal from the remote control device indicative of a user selection, via the second option, to initiate capture of the user voice recording;
   causing, by the receiving device, an audio capture device to capture the user voice recording in response to receiving the second signal;
   synchronizing, by the receiving device, the user voice recording and the recorded video clip of the AV stream;
   generating, by the receiving device, an issue report based on the log, the recorded video clip of the AV stream, and the user voice recording; and
   transmitting, by the receiving device, the issue report, via a communications network, to a network-connected customer service platform for processing.

2. A method comprising:
   receiving, by a receiving device, an indication of an issue associated with the presentation of an audiovisual (AV) stream;
   generating, by the receiving device, an issue report in response to receiving the indication of the issue, the issue report including:
      an operational log associated with the receiving device;
      a video clip recorded from the AV stream; and
      a user voice recording that is synchronized with the video clip; and
   transmitting, by the receiving device, via a communication network, the generated issue report to a server.

3. The method of claim 2, wherein receiving the indication of the issue includes:
   receiving, by the receiving device, a signal from a remote control device indicative of a user-detected issue.

4. The method of claim 2, wherein receiving the indication of the issue includes:
   receiving, by the receiving device, the user voice recording from an audio capture device;
   processing, by the receiving device, the user voice recording using natural language processing; and
   recognizing, by the receiving device, the user voice recording as indicative of the issue based on the processing.

5. The method of claim 2, wherein receiving the indication of the issue includes:
   receiving, by the receiving device, a notification from an internal component of the receiving device, the notification generated by the internal component in response to automatically detecting the issue.

6. The method of claim 2, wherein the issue report further includes a screen capture of the AV stream.

7. The method of claim 2, further comprising:
   continually recording the AV stream;
   storing a recording of the AV stream in a storage unit of the receiving device;
   generating the video clip based on the stored recording in response to receiving the indication of the issue.

8. The method of claim 2, further comprising:
   initiating capture of the user voice recording in response to receiving the indication of the issue.

9. The method of claim 8, wherein the user voice recording is captured by an audio capture device associated with any of the receiving device or a remote control device that is communicatively coupled to the receiving device.

10. The method of claim 2, wherein the issue report is generated as an object file.

11. The method of claim 2, wherein the the video clip of the AV stream and/or the user voice recording are associated with one or more time stamps, and wherein generating the issue report includes synchronizing the video clip and the user voice recording based on the one or more time stamps.

12. The method of claim 2, further comprising:
   processing, by the receiving device, any of the operation log, the video clip, and/or the user voice recording to determine a characteristic of the issue before transmitting the issue report;
   wherein the issue report is transmitted for delivery to a particular recipient based on the determined characteristic of the issue.

13. The method of claim 2, further comprising:
   receiving, by the receiving device, a media stream from a media source;
   generating, by the receiving device, the AV stream based on the received media stream; and
   outputting, by the receiving device, the AV stream for presentation at a presentation device.

14. The method of claim 2, further comprising:
   causing, by the receiving device, a graphical prompt to be presented at the presentation device in response to receiving the indication of the issue, the graphical prompt including an option to generate the video clip recorded from the AV stream;
   receiving, by the receiving device, a signal from a remote control device indicative of a user selection via the graphical prompt; and
   generating and storing the video clip in response to receiving the signal.

15. The method of claim 2, further comprising:
causing, by the receiving device, a graphical prompt to be presented at the presentation device in response to receiving the indication of the issue, the graphical prompt including an option to capture a voice recording;
receiving, by the receiving device, a signal from a remote control device indicative of a user selection via the graphical prompt;
causing, by the receiving device, an audio capture device to capture the user voice recording; and
storing, by the receiving device, the captured user voice recording in a storage device.

16. A receiving device configured to receive a media stream from a media source and convert the media stream into an audiovisual (AV) stream for presentation at a presentation device, the receiving device comprising:
one or more processors configured to generate an issue report in response to receiving an indication of an issue associated with the presentation of the AV stream, the issue report based on:
a log including operational details of the receiving device at a time when the issue occurred;
a video clip recorded from the AV stream; and
a user voice recording; and
a communication module configured to transmit the issue report, via a communications network, to a server for processing.

17. The receiving device of claim 16, further comprising any one or more of:
a storage device configured to store the recorded portion of the AV stream and/or the user voice recording;
a user communication module configured to receive user signals from a remote control device; or
an audio capture device configured to initiate capture of the user voice recording in response to a first signal received from the remote control device.

18. The receiving device of claim 16, wherein receiving the indication of the issue includes any of:
receiving a signal from a remote control device indicative of a user-detected issue; or
receiving a notification from an internal component of the receiving device, the notification generated by the internal component in response to automatically detecting the issue.

19. The receiving device of claim 16, wherein the video clip and/or the user voice recording are associated with one or more time stamps, and wherein generating the issue report includes synchronizing the video clip and the user voice recording based on the one or more time stamps.

20. The receiving device of claim 16, wherein the one or more processors are further configured to:
process any of the log, the video clip, and/or the user voice recording to determine a characteristic of the issue before transmitting the issue report;
wherein the issue report is transmitted for delivery to a particular recipient based on the determined characteristic of the issue.

* * * * *

UNITED STATES PATENT AND TRADEMARK OFFICE
CERTIFICATE OF CORRECTION

PATENT NO. : 10,979,765 B2  
APPLICATION NO. : 16/237630  
DATED : April 13, 2021  
INVENTOR(S) : Sanket Rege Page 1 of 1

It is certified that error appears in the above-identified patent and that said Letters Patent is hereby corrected as shown below:

In the Claims

Claim 11, Column 16, Line 37, after "wherein" please delete the second "the"

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*